United States Patent
Damnjanovic et al.

(10) Patent No.: US 10,244,399 B2
(45) Date of Patent: Mar. 26, 2019

(54) SIGNATURE SEQUENCE-BASED SIGNALING AND ALLOCATION OF RESOURCES OF A SHARED SPECTRUM

(71) Applicant: QUALCOMM Incorporated, San Diego, CA (US)

(72) Inventors: Aleksandar Damnjanovic, Del Mar, CA (US); Ahmed Sadek, San Diego, CA (US); Siddhartha Mallik, San Diego, CA (US); Juan Montojo, San Diego, CA (US); Michael Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/642,375

(22) Filed: Jul. 6, 2017

(65) Prior Publication Data

US 2018/0098225 A1     Apr. 5, 2018

Related U.S. Application Data

(60) Provisional application No. 62/402,878, filed on Sep. 30, 2016.

(51) Int. Cl.

| | |
|---|---|
| *H04W 16/14* | (2009.01) |
| *H04W 28/26* | (2009.01) |
| *H04W 48/16* | (2009.01) |
| *H04W 72/08* | (2009.01) |
| *H04W 74/08* | (2009.01) |
| H04W 88/06 | (2009.01) |

(52) U.S. Cl.
CPC ............ *H04W 16/14* (2013.01); *H04W 28/26* (2013.01); *H04W 48/16* (2013.01); *H04W 72/085* (2013.01); *H04W 74/08* (2013.01); H04W 88/06 (2013.01)

(58) Field of Classification Search
CPC ..... H04W 16/14; H04W 28/26; H04W 48/16; H04W 72/085; H04W 74/08; H04W 88/06
USPC .......................................................... 455/454
See application file for complete search history.

(56) References Cited

U.S. PATENT DOCUMENTS

| | | |
|---|---|---|
| 2009/0103558 A1 | 4/2009 | Zangi et al. |
| 2009/0298522 A1 | 12/2009 | Chaudhri et al. |

(Continued)

FOREIGN PATENT DOCUMENTS

| | | |
|---|---|---|
| WO | WO-2016100319 A1 | 6/2016 |

OTHER PUBLICATIONS

International Search Report and Written Opinion—PCT/US2017/053323—ISA/EPO—dated Dec. 6, 2017.

*Primary Examiner* — Mong-Thuy T Tran
(74) *Attorney, Agent, or Firm* — Loza & Loza, LLP

(57) ABSTRACT

Aspects of the disclosure relate to wireless communication systems configured to share a shared spectrum with one or more other systems (e.g., other operator networks utilizing the same radio access technology, and/or other networks utilizing different radio access technologies). Coexistence between the different systems on the shared spectrum may be provided by utilizing a technology-neutral signature waveform such as a signature sequence or discovery signal. The signature sequence may be used for resource reservation, scheduling, and coordination among disparate systems operating on a shared spectrum. Other aspects, embodiments, and features are also claimed and described.

26 Claims, 11 Drawing Sheets

(56) References Cited

U.S. PATENT DOCUMENTS

| | | |
|---|---|---|
| 2010/0105405 A1 | 4/2010 | Vujcic |
| 2012/0182883 A1 | 7/2012 | Junell et al. |
| 2013/0322279 A1* | 12/2013 | Chincholi ............. H04W 24/10 |
| | | 370/252 |
| 2015/0223075 A1* | 8/2015 | Bashar .................. H04W 16/14 |
| | | 370/329 |
| 2015/0319784 A1 | 11/2015 | Bhushan et al. |
| 2015/0351121 A1 | 12/2015 | Luo et al. |
| 2016/0100433 A1 | 4/2016 | Vajapeyam et al. |
| 2016/0105897 A1* | 4/2016 | Liu ................... H04W 72/1226 |
| | | 370/235 |
| 2016/0302225 A1 | 10/2016 | Damnjanovic et al. |
| 2017/0142737 A1* | 5/2017 | Zheng ................ H04W 72/085 |
| 2017/0280479 A1* | 9/2017 | Frenne ................. H04W 16/14 |
| 2017/0331670 A1* | 11/2017 | Parkvall ............... H04J 11/0079 |
| 2018/0176891 A1* | 6/2018 | Kim .......................... H04L 5/00 |

\* cited by examiner

SIGNATURE SEQUENCE-BASED SIGNALING AND ALLOCATION OF RESOURCES OF A SHARED SPECTRUM

PRIORITY CLAIM

This application claims priority to and the benefit of provisional patent application No. 62/402,878 filed in the United States Patent and Trademark Office on 30 Sep. 2016, the entire content of which is incorporated herein by reference as if fully set forth below in its entirety and for all applicable purposes.

TECHNICAL FIELD

The technology discussed below relates generally to wireless communication systems, and more particularly, to the signaling of resource usage and allocation of resources in a shared spectrum via a signature sequence. Embodiments can provide and enable techniques for coexistence of multiple different systems in the shared spectrum.

INTRODUCTION

A shared spectrum may be a band or channel that may be shared by two or more different systems or technologies. Such a shared spectrum may be a shared licensed band, shared by different devices having subscriptions to different operator networks using the same radio access technology (RAT). In another example, the shared spectrum may be a shared unlicensed band, shared by different devices operating according to different standards or communication protocols (e.g., two or more RATs). Of course, the shared spectrum may be a combination of the above, where any suitable number of different systems (e.g., different RATs, and/or different operators within each RAT) may share the spectrum, as long as those systems comply with any predetermined or agreed technology restrictions on its use.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum of this disclosure may not be completely unrestricted. That is, not any arbitrary technology may be allowed to access the shared spectrum. Rather, an agreement may be established where certain technology restrictions may be in place to limit which systems and technologies may access and use the shared spectrum.

Within its unlicensed band, Wi-Fi technology employs a certain carrier sense (CS) or listen-before-talk (LBT) mechanism to control access to its unlicensed band. While this CS mechanism provides for functionality suitable for many purposes, the recent increase in technologies that wish to share access to the unlicensed band has created certain coexistence issues. Accordingly, for the shared spectrum, the CS coexistence mechanism used by Wi-Fi or the like may not be adequate.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide for resource reservation, scheduling, and coordination among disparate systems operating on a shared spectrum. The coordination may be achieved utilizing a waveform (e.g., a discovery waveform, a signature sequence) configured in such a way as to be understood by all systems operating on the shared spectrum. These different systems may correspond to different operator networks operating on a single radio access technology (RAT), and/or different networks utilizing different RATs.

One aspect of the disclosure provides a method of wireless communication operable by a first device utilizing a shared spectrum for communication over a first system. The first device semi-statically reserves a first set of resources on the shared spectrum by utilizing a first waveform configured to be understood by a plurality of systems utilizing the shared spectrum. The first device transmits, without first checking for a clear channel, at least one of synchronization signals, reference signals, broadcast channels, discovery signals, control channel messages, or quality of service (QoS) sensitive data, during the semi-statically reserved first set of resources. The first device further utilizes a contention-based access mechanism to access the shared spectrum using a second set of resources other than the first set of resources.

Another aspect of the disclosure provides a wireless communication device that includes a processor, a memory communicatively coupled to the processor, and a transceiver communicatively coupled to the processor. The processor, transceiver, and memory are configured to semi-statically reserve a first set of resources on a shared spectrum for communication over a first system by utilizing a first waveform configured to be understood by a plurality of systems utilizing the shared spectrum. The processor, transceiver, and memory are further configured to transmit, without first checking for a clear channel, at least one of synchronization signals, reference signals, broadcast channels, discovery signals, control channel messages, or quality of service (QoS) sensitive data, during the semi-statically reserved first set of resources, and utilize a contention-based access mechanism to access the shared spectrum using a second set of resources other than the first set of resources.

Another aspect of the disclosure provides a computer readable medium storing computer executable code comprising instructions for causing a first device to utilize a shared spectrum for communication over a first system. The instructions cause the first device to semi-statically reserve a first set of resources on the shared spectrum by utilizing a first waveform configured to be understood by a plurality of systems utilizing the shared spectrum. The instructions further cause the first device to transmit, without first checking for a clear channel, at least one of synchronization signals, reference signals, broadcast channels, discovery signals, control channel messages, or quality of service (QoS) sensitive data, during the semi-statically reserved first set of resources. The instructions further cause the first device to utilize a contention-based access mechanism to access the shared spectrum using a second set of resources other than the first set of resources.

Another aspect of the disclosure provides a wireless communication device configured to utilize a shared spectrum for communication over a first system. The wireless communication device includes means for semi-statically reserving a first set of resources on the shared spectrum by utilizing a first waveform configured to be understood by a plurality of systems utilizing the shared spectrum. The wireless communication device further includes means for transmitting, without first checking for a clear channel, at least one of synchronization signals, reference signals, broadcast channels, discovery signals, control channel messages, or quality of service (QoS) sensitive data, during the semi-statically reserved first set of resources. The wireless communication device further includes means for utilizing a contention-based access mechanism to access the shared spectrum using a second set of resources other than the first set of resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the disclosure provide for resource reservation, scheduling, and coordination among disparate systems operating on a shared spectrum. The coordination may be achieved utilizing a discovery waveform or a signature sequence configured in such a way as to be understood by all systems operating on the shared spectrum. These different systems may correspond to different operator networks operating on a single radio access technology (RAT), and/or different networks utilizing different RATs.

Figure 1:
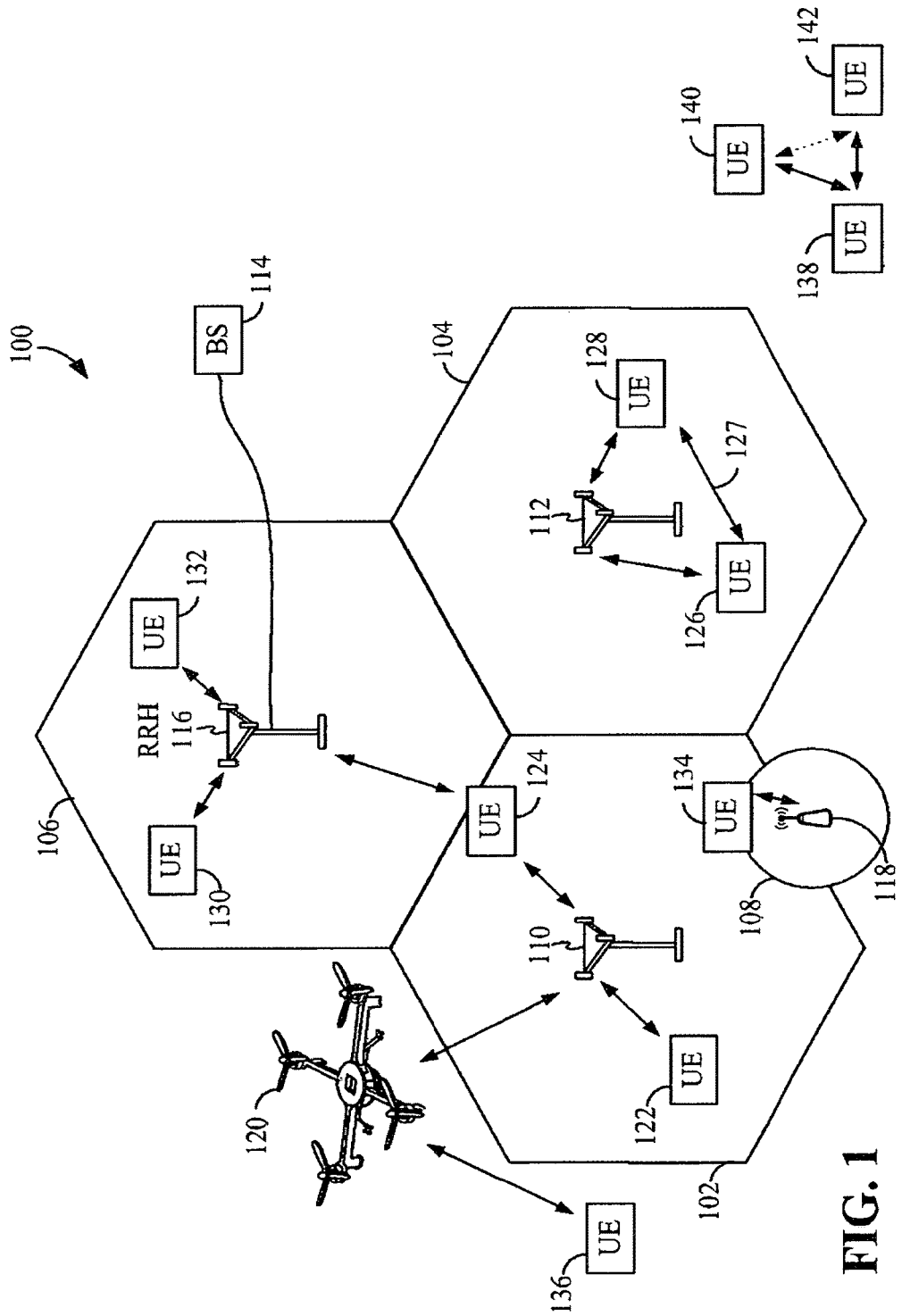
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at the base station (a scheduling entity). Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, and/or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. That is, not any arbitrary operators or RATs may be allowed to access the shared spectrum. For example, the holder of a license for a portion of licensed spectrum may provide licensed shared access (LSA) to share that spectrum with other parties, e.g., with suitable licensee-determined conditions to gain access. An agreement may be established where certain technology restrictions may be in place to limit which systems and technologies may access and use the shared spectrum.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Thus, in a wireless communication network with scheduled access to time—frequency resources and having a cellular configuration, a P2P configuration, or a mesh configuration, a scheduling entity and one or more scheduled entities may communicate utilizing the scheduled resources.

The air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The access network 100 described above in relation to FIG. 1 is only one exemplary system that may share access to a shared spectrum with other systems.

Figure 2:
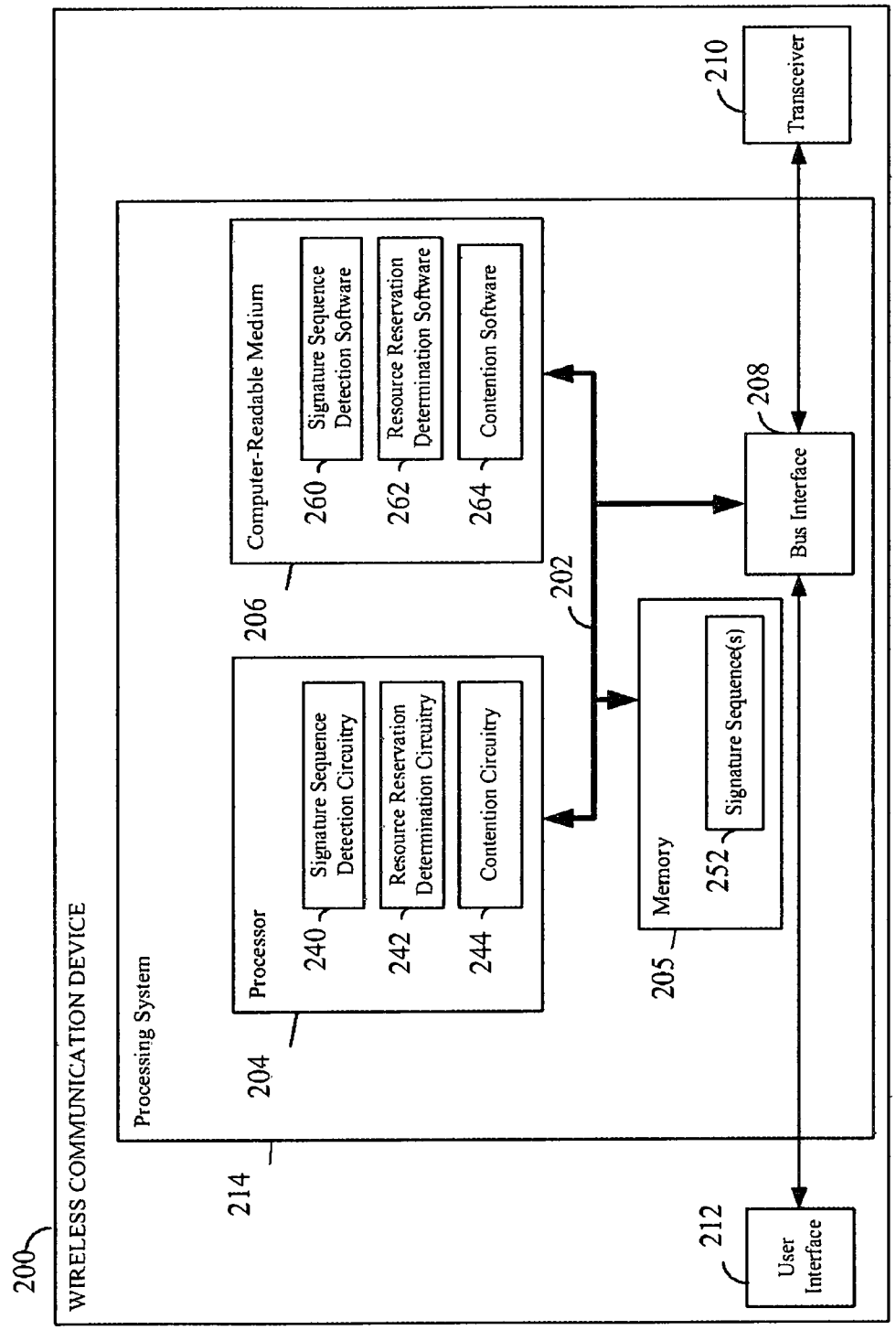
FIG. 2 is a block diagram illustrating an example of a hardware implementation for a wireless communication device employing a processing system.

FIG. 2 is a simplified block diagram illustrating an example of a hardware implementation for a wireless communication device 200 employing a processing system 214. For example, the wireless communication device 200 may be a user equipment (UE) as illustrated in FIG. 1. In another example, the wireless communication device 200 may be a base station as illustrated in FIG. 1.

The wireless communication device 200 may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 200 may be configured to perform any one or more of the functions described herein. That is, the processor 204, as utilized in a wireless communication device 200, may be used to implement any one or more of the processes described below and illustrated in FIGS. 3-11.

In this example, the processing system 214 may be implemented with a bus architecture, represented generally by the bus 202. The bus 202 may include any number of interconnecting buses and bridges depending on the specific application of the processing system 214 and the overall design constraints. The bus 202 communicatively couples together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

In some aspects of the disclosure, the processor 204 may include signature sequence detection circuitry 240 configured for various functions, including, for example, detecting a signature sequence transmitted by any other system on the shared spectrum.

In some aspects of the disclosure, the processor 204 may include resource reservation determination circuitry 242 configured for various functions, including, for example, determining whether resources on the shared spectrum are reserved (e.g., semi-statically and/or dynamically) for the system utilized by the wireless communication device 200, or by some other systems.

In some aspects of the disclosure, the processor 204 may include contention circuitry 244 configured for various functions, including, for example, performing contention-based access to resources on the shared spectrum.

The processor 204 is responsible for managing the bus 202 and general processing, including the execution of software stored on the computer-readable medium 206. The software, when executed by the processor 204, causes the processing system 214 to perform the various functions described below for any particular apparatus. The computer-readable medium 206 and the memory 205 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 206 may include signature sequence detection software 260 configured for various functions, including, for example, detecting a signature sequence transmitted by any other system on the shared spectrum.

In some aspects of the disclosure, the computer-readable medium 206 may include resource reservation determination software 262 configured for various functions, including, for example, determining whether resources on the shared spectrum are reserved (e.g., semi-statically and/or dynamically) for the system utilized by the wireless communication device 200, or by some other systems.

In some aspects of the disclosure, the computer-readable medium 206 may include contention software 264 configured for various functions, including, for example, performing contention-based access to resources on the shared spectrum.

Various aspects of the present disclosure provide for the coexistence of a variety of systems and technologies for wireless communication on a shared spectrum. As described further below, this coexistence may be provided by the transmission of a suitable waveform (e.g., a discovery waveform, a signature sequence) on the shared spectrum, where the waveform or signature sequence is standardized or commonly understood by all systems accessing the shared spectrum. The signature sequence or waveform may be technology-neutral or technology-agnostic. That is, a signature sequence may be utilized, having a particular waveform that is common to, or understood by, all systems sharing the shared spectrum. In other words, the signature sequence may provide a minimum set of waveforms or messages that will be understood by all technologies or systems sharing the spectrum. In this way, even systems utilizing dramatically different technologies from one another for their data and control channels on the shared spectrum may be enabled to coordinate with one another to separate and share the shared spectrum. Such technology-neutral waveform or signature sequence enables disparate systems to detect the presence of each other to facilitate shared access to the shared spectrum.

A shared spectrum may be a band or channel that may be shared by two or more different systems. As used in the present disclosure, a system may refer to an operator network and/or a radio access technology (RAT). That is, the shared spectrum may be a shared licensed band (shared by devices subscribing to two or more operator networks using the same RAT), a shared unlicensed band (shared by devices using two or more RATs), or some combinations of the above.

A shared spectrum may be considered in some ways to be similar to an unlicensed band, such as the 2.4 GHz band used by Wi-Fi, Bluetooth, and a number of other different systems and technologies. However, unlike an unlicensed band, the shared spectrum may not be completely unrestricted. That is, not any arbitrary technology may be allowed to access the shared spectrum. Rather, an agreement may be established where certain technology restrictions may be in place to limit which systems and technologies may access and use the shared spectrum.

In a particular implementation, the shared spectrum may occupy any suitable band, such as but not limited to a 3.5 GHz band. In some examples, multiple operators or operator networks with the same radio access technology (RAT) may occupy the shared spectrum. In some examples, multiple RATs may occupy the shared spectrum. Broadly, any suitable number of different systems (e.g., different RATs, and/or different operators within each RAT) may share the shared spectrum when they comply with the predetermined or agreed technology restrictions on its use.

According to an aspect of the disclosure, a suitable coexistence mechanism common across different operators and across different RATs may be defined to enable this variety of different systems to coexist or share the shared spectrum. Across different operators using the same RAT, and across networks using different RATs, a common understanding between these respective systems can enable users of the different systems to be aware of one another and achieve fair access to the shared spectrum.

In the prior art, regulations generally exist for the use of unlicensed spectrum. For example, before transmitting, devices may be required to check for the presence of other devices occupying the channel. This is frequently referred to as a listen-before-talk (LBT) mechanism. As one example, ETSI (European Telecommunications Standards Institute) has defined one LBT mechanism wherein, when a device wishes to transmit on the unlicensed spectrum, the device must detect the energy level on the shared spectrum at a designated time for a duration or listening time called a clear channel assessment (CCA) period. If the detected energy is below a CCA threshold, then the device can transmit on the unlicensed spectrum for a given channel occupancy time.

As one particular example, Wi-Fi networks (e.g., those defined by IEEE 802.11 standards) provide for shared access to an unlicensed band using an LBT or carrier sense (CS) algorithm that involves CCA and a network allocation vector (NAV). Here, the CCA algorithm involves a device detecting and decoding a Wi-Fi preamble transmitted by another device as a part of a physical layer convergence protocol (PLCP) frame. Within the preamble is included a legacy short training field (L-STF) and a legacy long training field (L-LTF), which include information that allows a device to detect the signal, perform frequency offset estimation, timing synchronization, etc. The L-STF includes 10 short training symbols, each having a length of 0.8 µs. The L-LTF includes two long training symbols, each having a length of 3.2 µs. However, the Wi-Fi preamble is not technology-neutral.

If a device senses or detects a Wi-Fi signal preamble, it will report the carrier as busy for the length of the frame. CCA further involves the device detecting the energy level of noise and interference on the carrier from non-Wi-Fi sources. The carrier may be reported as busy if an energy detection sample indicates energy above a given threshold. The NAV enables a device to explicitly reserve the carrier for transmission of a number of frames after the current frame. This reservation is made by encoding corresponding information in the PLCP frame header.

While this CS algorithm has proven useful for the unlicensed band, it has certain shortcomings that make the same mechanism unsuitable for the shared spectrum described above. For example, the Wi-Fi mechanism, including the predetermined or predefined preamble described above, is not suitably forward compatible to enable new technologies to share the unlicensed band when those new technologies may employ vastly different communication mechanisms incompatible with their predecessor technologies. That is, any new Wi-Fi versions must repeat the same preamble, which restricts the technology.

Furthermore, the Wi-Fi preamble does not have suitable penetration that may be desired for the shared spectrum described above (e.g., cannot be reliably detected at −6 dB SNR). For the shared spectrum, it may be desired to employ the simplest possible mechanism, to reduce any restrictions that must be placed on the different systems or technologies to enable them to understand one another.

Therefore, a standard or technology-neutral waveform (e.g., a signature sequence) may be used, where the signature sequence is configured to be comprehensible by all systems that access the shared spectrum. This signature sequence may act as a coexistence mechanism that signals resource usage, resource reservations, and/or resource requests to other systems and devices using the shared spectrum.

Figure 3:
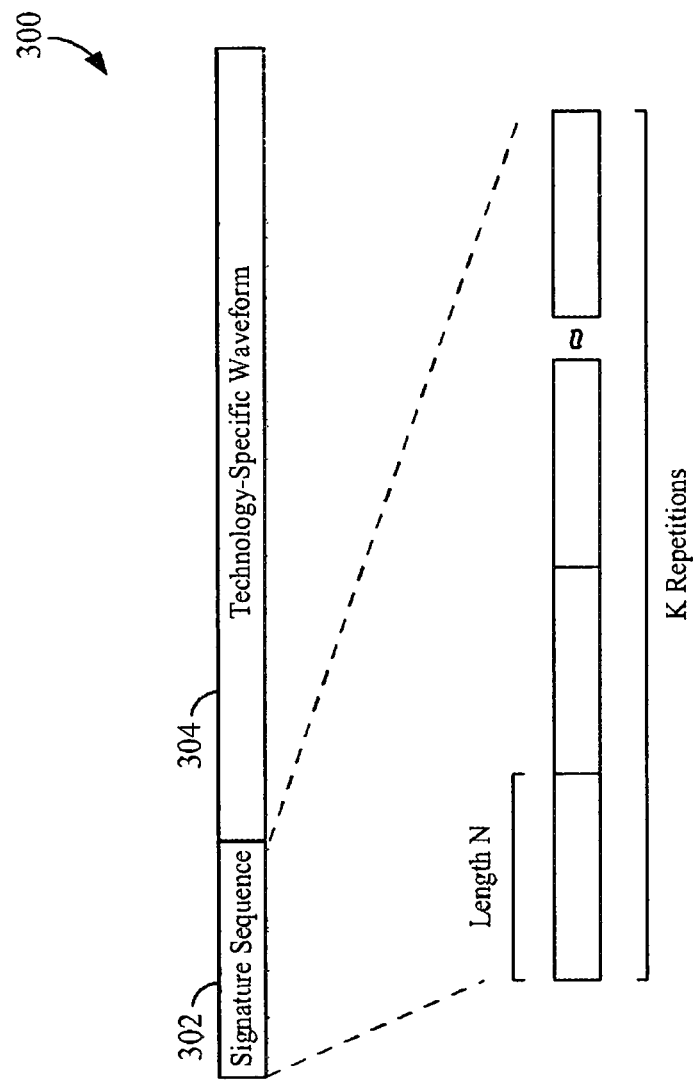
FIG. 3 is a diagram conceptually illustrating a signature sequence transmission according to some aspects of the disclosure.

FIG. 3 is a diagram conceptually illustrating a signature sequence transmission 300 according to some aspects of the disclosure. The transmission 300 includes a signature sequence 302 that may be followed by a technology-specific waveform 304 (e.g., LTE, WiFi, Bluetooth, etc.). In the example illustrated in FIG. 3, the signature sequence 302 provides a preamble to the technology-specific waveform 304. However, this use of such signature sequences, and this transmission structure is not intended to be limiting of the scope of the present disclosure. That is, while a signature sequence may in some examples act as a preamble, in other examples, a signature sequence as described herein may be a postamble to a technology-specific waveform, or even a standalone transmission not necessarily close in time to any technology-specific waveform.

The signature sequence 302 may be defined according to signature sequence parameters including a sample rate R, a length N, and a number of repetitions K. In one example, the sample rate R may be 1 μs, the length N may consist of 32 samples, and the number of repetitions K may consist of 32 repetitions. The repetitions of the signature sequence result in a high autocorrelation. Of course, any other suitable values may be used for any of the signature sequence parameters. The sequence within the length N (or in some examples, a portion of the sequence within the length N) may be the unique or defining characteristic of a sequence that identifies the system or RAT transmitting that sequence. In some examples, the sequence may also be used to facilitate access to a shared spectrum by way of a handshake process between devices. The handshaking (e.g., utilizing the signature sequence to provide nrRTS and nrCTS signals) will be described in more detail below.

According to an aspect of the present disclosure, the signature sequence may be characterized as a time-domain pattern that a receiving device can detect and identify. In some examples, a receiving device (e.g., a base station or UE) may utilize the signature sequence detection circuitry 240 (e.g., a correlation detector) to detect the presence of a signature sequence. That is, as described above, a signature sequence may be characterized by a known sampling rate R, a number of samples N, and a repetition factor K. With a suitable repetition factor, and with the known sampling rate and number of samples, a signature sequence transmission may exhibit a relatively high autocorrelation, enabling detection of the presence of a signature sequence. In some examples, the receiving device may utilize the signature sequence detection circuitry 240 to compare the received signature sequence to stored signature sequences 252, for example, by determining the correlation between the received signature sequence with the stored sequences. Each of the stored signature sequences 252 may identify a certain system and/or functions intended by the sequence.

In one aspect of the disclosure, a signature sequence may be utilized for channel reservation of resources on the shared spectrum, and may include information including but not limited to a length or duration of a reservation (e.g., in terms of a number of slots). The signature sequence may further indicate a period, if the reserved resources recur periodically (e.g., a semi-static reservation, discussed further below). The signature sequence may further indicate that the reservation is for a single instance or other aperiodic reservation. In some examples, an aperiodic reservation may take a lower priority than a periodic reservation, such that a device or system with an aperiodic reservation for resources may release the resources when another system has a periodic resource reservation for the same resource.

Figure 4:
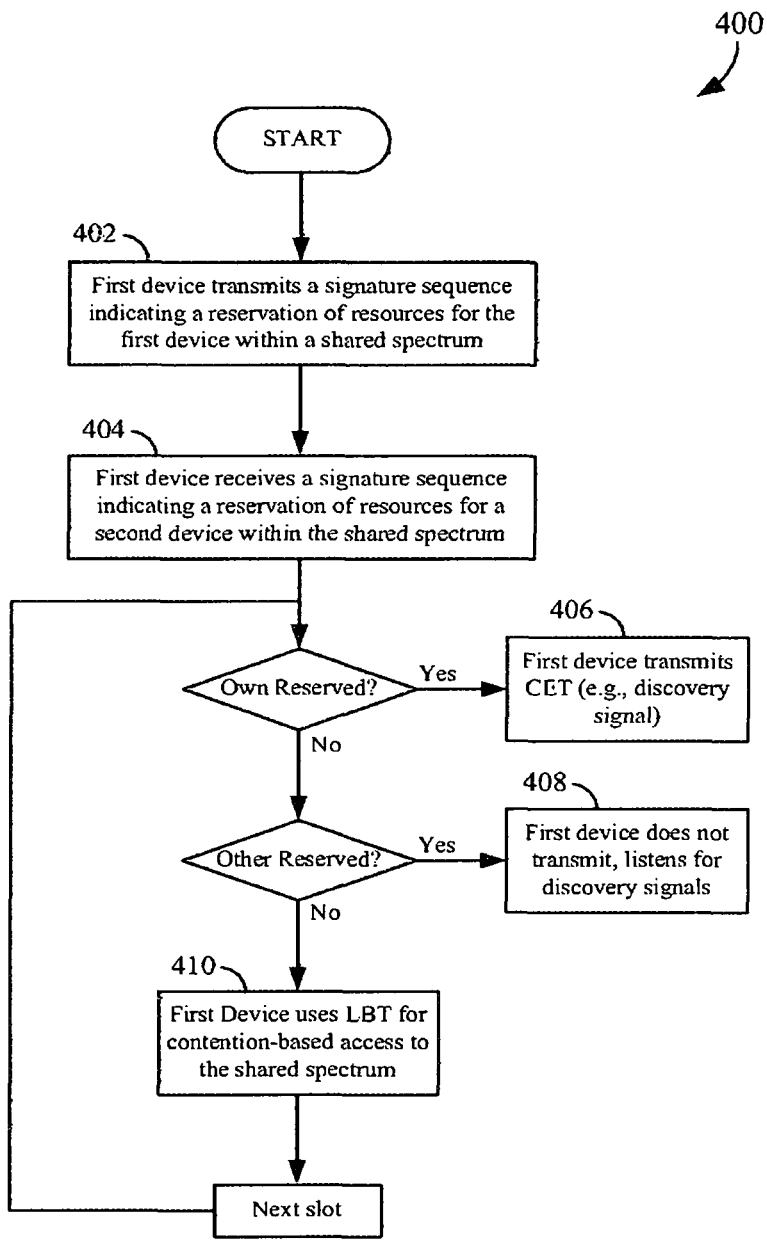
FIG. 4 is a flow chart illustrating an exemplary process for signaling resource usage in a shared spectrum according to some aspects of the disclosure.

FIG. 4 is a flow chart illustrating an exemplary process 400 for signaling resource usage in a shared spectrum according to some aspects of the disclosure. The process 400 may be performed using any of the wireless communication devices illustrated in FIGS. 1 and/or 2 or any apparatus. In one aspect of the disclosure, the process 400 may be performed using the wireless communication device 200 of FIG. 2.

As illustrated in this procedure, at block 402, a first device may transmit a waveform (e.g., a signature sequence) indicating a reservation of resources for the first device within a shared spectrum. For example, the resources may be time and frequency resources that may be utilized for wireless communication. At block 404, the first device may receive a signature sequence indicating a reservation of resources for some other resources for a second device within the shared spectrum. While this figure illustrates these operations in sequence, it is to be understood that these operations may occur periodically, aperiodically, and/or may occur at any given time. For example, the first device may in some examples generally monitor the channel for any incoming signature sequence transmissions from other devices, and may determine resource reservations whenever a signature sequence is detected. For example, signature sequences may be expected as a preamble to other transmissions on the shared spectrum. In another example, periodic transmissions of a signature sequence may operate according to a known schedule, so devices may be enabled to listen for any such signature sequences according to that schedule. Further, the first device and second device are described merely to illustrate certain concepts, and any number of devices may utilize the signature sequences in various aspects of the disclosure.

In any case, by virtue of the signature sequences, the first device may have information about which resources (e.g., which slots and/or band) are reserved for the first device itself, or are reserved for some other devices (e.g., the second device).

In an example, where the first device determines that a resource is the first device's own reserved resource, the first device may utilize the resource for a transmission on the shared spectrum at block 406. Because the resource is reserved for the first device, an LBT or other contention-based access procedure may not be necessary. That is, in some networks that utilize an unlicensed band, certain transmissions may be made without first checking for a clear channel. These CCA-exempt transmissions (CET) may occur in both uplink and downlink directions. For example, downlink CETs may typically include one or more synchronization signals, reference signals, broadcast channels, discovery signals, control channel messages, QoS sensitive data, and the like. Further, uplink CETs may typically include discovery signals, uplink control information, QoS sensitive data, and the like. An example of QoS sensitive data is voice data or the like. Some non-limiting examples of control channel messages are system information, paging messages, random access procedure messages, sounding reference signals, and/or channel quality feedback.

In some examples, resources for CETs on the shared spectrum may be protected from one operator to another, by utilizing various protection mechanisms. For example, resources for high priority signaling such as potential paging and access messages may be desired to have such protection to increase their reliability. As one example, access nodes or base stations may be configured to detect CETs and/or CET schedules from other operator networks sharing the shared spectrum. This detection may be performed directly via explicit signaling between the access nodes, or may be performed via channel measurements and/or reporting of channel measurements by UEs. In the illustrated example of FIG. 4, signature sequences may be utilized by devices to detect CET schedules.

On the other hand, at block 408, if the first device determines that the resource is reserved for another device (e.g., the second device), the first device may consider the resource a protected resource, and may accordingly not transmit, and may listen for any discovery signals (e.g., signature sequences) from other devices that may affect the determination of which resources are reserved or protected in the future.

If the first device determines that the resource (e.g., slot and/or band) is not reserved for the first device or for another device, then in some examples, the first device may consider the resource as a contention-based resource, and may utilize a suitable contention-based mechanism (e.g., LBT) to access the resource on the shared spectrum at block 410.

Figure 5:
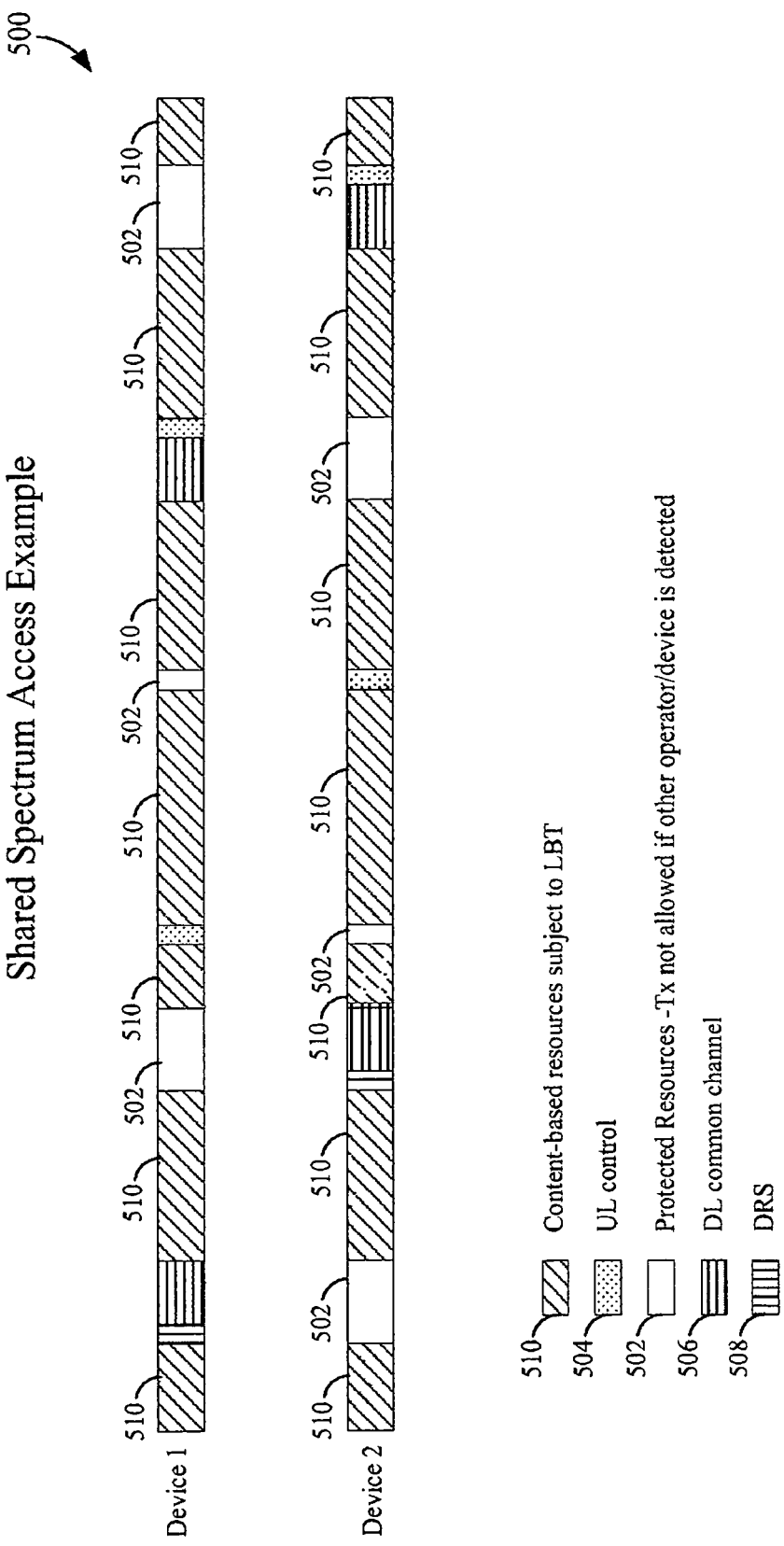
FIG. 5 is a schematic illustration of transmission timelines for two different devices operating on two different systems, sharing the shared spectrum according to some aspects of the disclosure.

FIG. 5 is a schematic illustration of transmission timelines 500 for two different devices operating on two different systems, sharing a shared spectrum. As illustrated in FIG. 5, each system may consider certain of the resources 502 as protected resources wherein a transmission is not allowed. As described above and for example in relation to FIGS. 3-4, the protection schedule may be conveyed between the devices by virtue of a suitable waveform (e.g., a signature sequence or discovery signal) prior to the illustrated timelines, wherein the signature sequence is configured to utilize a transmission format that is understood by both systems that may not use the same RAT. For example, the signature sequence may be similar to the signature sequence 302 described above in relation to FIG. 3. In some aspects of the disclosure, the protection of a resource may be conditional, for example, wherein the protection is only applied if the other system is detected as utilizing the protected resource. In that case, a device may opportunistically utilize conditionally protected resource when it is not utilized by another device or system to which the protected resource is reserved for.

During each system's operation, when one system (e.g., device 1 or device 2) considers the resource as a protected resource 502, the other system may utilize the protected resource for UL control 504, DL common channel 506, and/or discovery reference signal (DRS) 508. For example, the other system may transmit information (e.g., CETs) including but not limited to reference signals (e.g., DRS), uplink control signals, downlink common signals, etc. In an aspect of the disclosure, CETs made during a protected resource 502 may include discovery signals utilizing a waveform (e.g., a signature sequence) configured to utilize a transmission format that is understood by both systems.

Otherwise, when a resource is not a protected resource, in the illustrated example, devices operating on both systems may consider the resource as a contention-based resource 510, subject to LBT or some other suitable contention mechanism to gain access to that resource. For example, this resource may be used for UL/DL dedicated channels and UL/DL shared channels.

While the illustration in FIG. 5 shows the reservation of resources on the shared spectrum as protected resources 502, enabling a device to transmit CETs, this is not the only example wherein the signature sequence may be used to signal resource usage between different systems. In another example, a data channel may be protected as well. Here, the data channel may generally be protected by a discovery signal. That is, as described above, a discovery signal may be a waveform (e.g., a signature sequence) transmitted by a device (e.g., a UE and/or a base station) during a protected resource. For example, the discovery signal may be a CET. In this way, all users of the shared spectrum (e.g., UEs and base stations) may detect the discovery signal and may share the channel for data transmissions according to the discovery signal. That is, partitioning of at least a portion of the resources between different systems may be based on discovery signal or signal sequence transmissions.

Figure 6:
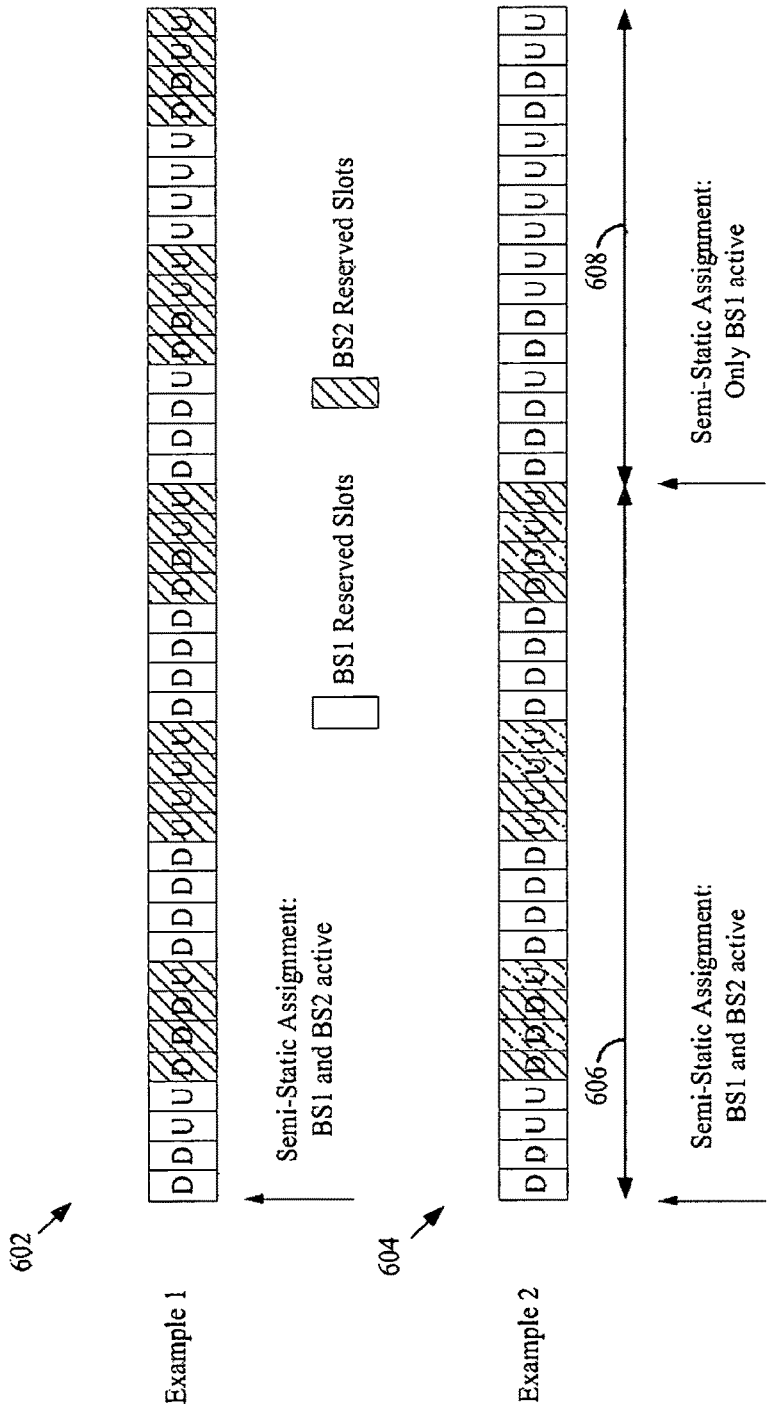
FIG. 6 is a schematic timeline illustrating protected data channels sharing according to some aspects of the disclosure.

FIG. 6 is a schematic timeline illustrating protected data channels according to one aspect of the disclosure. As illustrated here, in Example 1, a data channel 602 is shown having its resources equally partitioned between two systems (e.g., base stations BS1 and BS2). That is, two base stations operating in two different systems may detect that the other is active (e.g., based on discovery signals or signature sequences), and based thereupon, may partition the resources of the data channel 602 between one another. The equal partitioning shown here is merely one example for illustration, and any suitable partitioning, whether equal or unequal, may be utilized in a particular implementation.

When a data channel is protected, as described here in FIG. 6, a contention-based access mechanism such as LBT may not be necessary for use of the data channel. That is, as it may be known to one system that other systems will consider that data channel protected for a given set of resources, contention-based access may be avoided during those resources.

The allocation of the resources of the data channel among the different systems may be considered a semi-static configuration. That is, the determined allocation between different systems may remain effective until such a time as another discovery signal or signature sequence modifies the configuration.

As seen in this illustration in FIG. 6, the data channel resources allocated to a system (e.g., BS1 or BS2) may be utilized for uplink and/or downlink transmissions (illustrated as U and D, respectively), which may be determined by the respective system to which the resources are allocated.

Example 2 illustrates that the allocation of resources need not be equal divided, and need not persist on a permanent basis. For example, the semi-static assignment of data channel resources (e.g., data channel 604) on the shared spectrum may be equally partitioned between base stations (e.g., BS1 and BS2) on two systems for a first period 606, but in a second period 608, a base station (e.g., BS2) on one of the systems may be the only one active, and that base station may utilize all of the data channel resources for uplink and/or downlink transmissions.

As described above, some examples may utilize a contention-based access mechanism for controlling the allocation of resources for data/control channels, and other examples may utilize a semi-static allocation of resources for data/control channels among different systems. Each of these different mechanisms has different advantages. For example, in a shared spectrum with few users, where usage of the resources may be somewhat sparse, and/or where interference between different systems may be low, an LBT or other contention-based access mechanism may be unnecessary. Here, the semi-static resource allocation may suffice, wherein the users may incur less overhead and utilize the data channel resources according to a non-contention based mechanism when those resources are owned or reserved by a given system. On the other hand, when there is a potentially high amount of interference and/or a large number of interferers, the LBT mechanism may provide for a more dynamic adaptation of the resource allocation according to the needs of the different systems at a given time.

Figure 7:
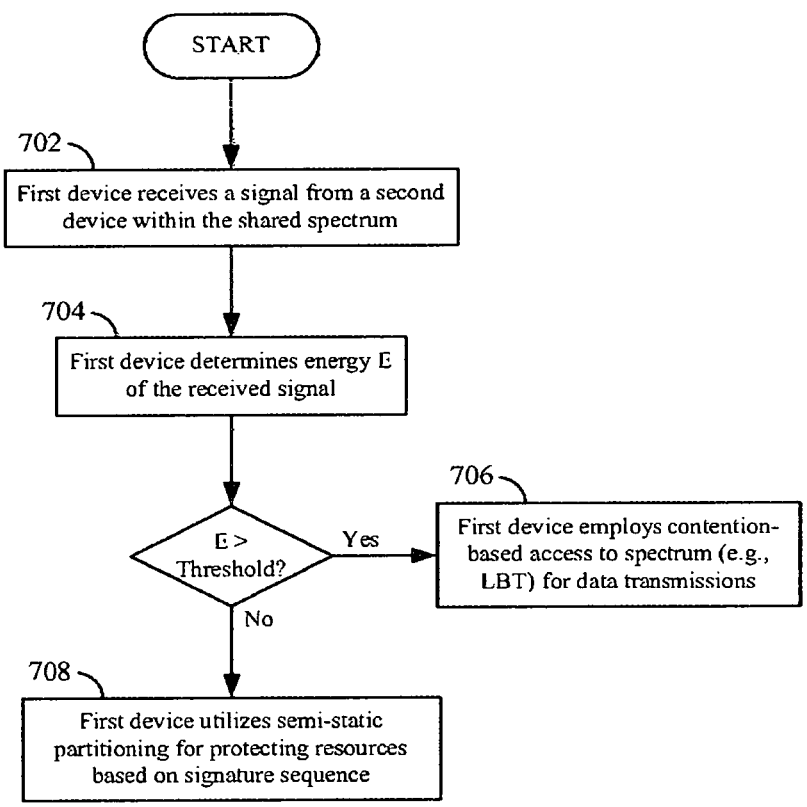
FIG. 7 is a flowchart illustrating an exemplary process for determining a resource allocation mechanism depending on one or more parameters according to some aspects of the disclosure.

Therefore, according to a further aspect of the present disclosure, the allocation of resources for the data/control channels on a shared spectrum may select between these different resource allocation mechanisms based on one or more parameters. FIG. 7 is a flowchart illustrating an exemplary process for determining a resource allocation mechanism depending on one or more parameters. This process may be performed by any of the devices or apparatuses described in relation to FIGS. 1 and/or 2.

For example, a device or node in one system may determine whether devices or nodes in another system are within a given energy and/or preamble detection range. Thus, at block 702, a first device (e.g., a UE or base station) may utilize a transceiver 210 (see FIG. 2) to receive a signal (e.g., a signature sequence or discovery waveform) from a second device within the shared spectrum (e.g., where the first device and the second device operate in different systems). At block 704, the first device may use signature sequence detection circuitry 240 (see FIG. 2) to determine the energy E of the received signal. In one example, the device may determine the energy E based on the received signal strength indicator (RSSI) of the signal or other commonly known methods. The determination of the energy E is merely one example of a suitable parameter, and any suitable detection of a signal may be utilized. In one example, the signal evaluated here may be a signature sequence transmission (e.g., a discovery signal, as described above).

At block 706, if the first device determines that the detected energy E of the detected discovery signal is above an energy threshold, then the first device may employ a contention-based access mechanism (e.g., LBT) for transmission on the data channel on the shared spectrum. At block 708, if the first device determines that the detected energy E of the detected discovery signal is not above the energy threshold, then the first device may utilize semi-static partitioning for protecting resources on the data channel. For example, the first device may protect resources based on information received in a signature sequence (e.g., a discovery signal) from other systems. The semi-static partitioning may in some examples be based on the signal upon which this determination is based, while in other examples, the semi-static partitioning may be based on an earlier-received signature sequence.

Figure 8:
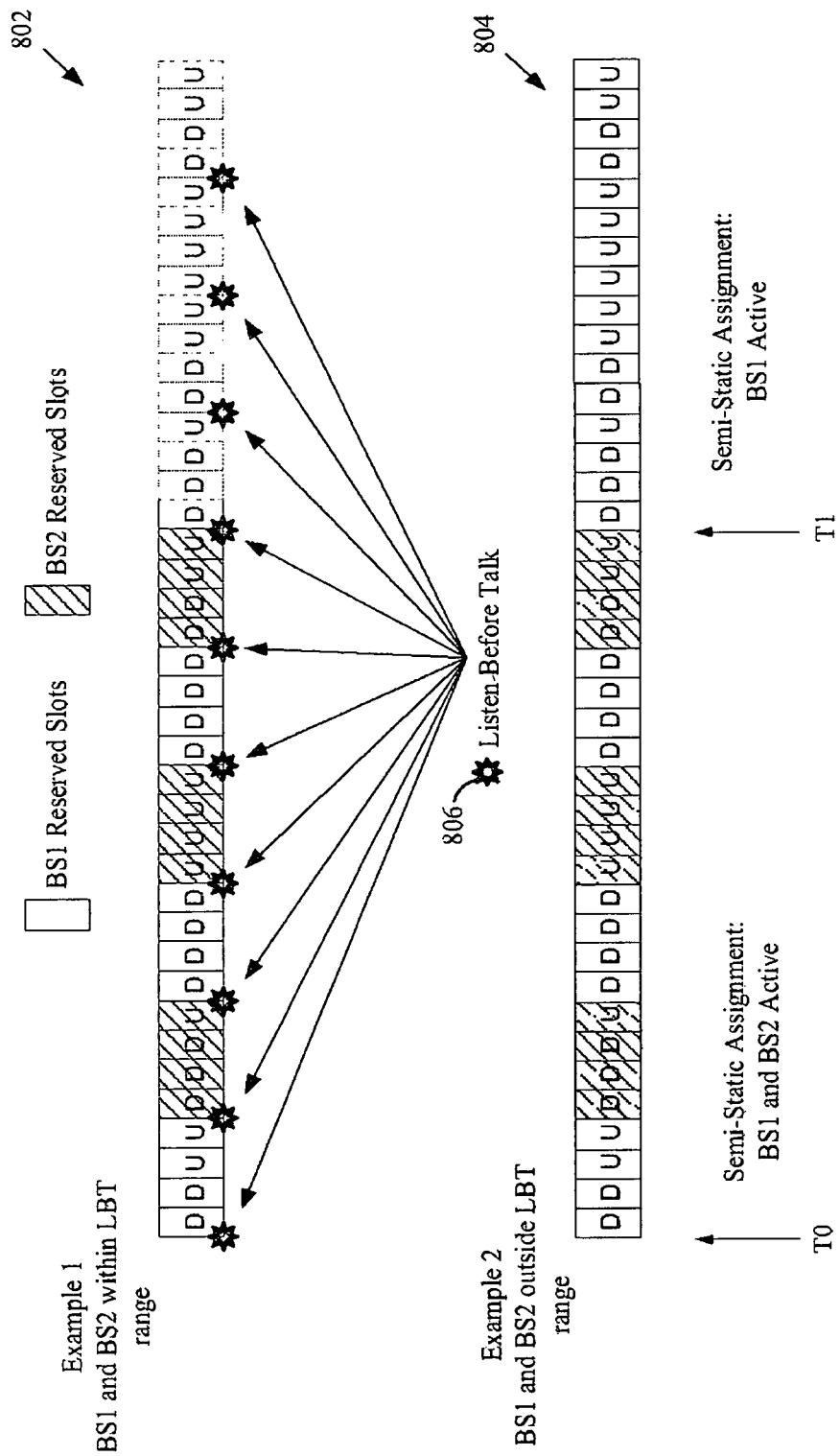
FIG. 8 is a schematic timeline illustration of two example timelines of utilizing a shared spectrum according to some aspects of the disclosure.

FIG. 8 is a schematic timeline illustration of two exemplary shared spectrum timelines according to some aspects of the disclosure. For example, a first timeline 802 may be used in contention-based access, and a second timeline 804 may be used in semi-static partitioning of resources of a shared spectrum, according to the process described above and illustrated in FIG. 7. In the first exemplary timeline 802, operation is shown wherein a detected energy E of a waveform from a different system is greater than an energy threshold (or otherwise, the different system is determined to be within a range to increase interference between the respective systems). As illustrated here, the dynamic allocation of resources between the first system (e.g., illustrated as BS1) and the second system (e.g., illustrated as BS2) may be performed based on an LBT procedure, where, for example, devices in each system implement a CS algorithm periodically once every four slots. Based on the LBT results 806, BS1 or BS2 may utilize the resources of the shared spectrum, e.g., for uplink or downlink transmission.

In the second exemplary timeline 804 of FIG. 8, operation is shown wherein a detected energy E of a waveform from a different system is not greater than an energy threshold (or otherwise, the different system is determined not to be within a range to cause substantial interference between the respective systems). As illustrated here, the allocation of resources between the first system (e.g., BS1) and the second system (e.g., BS2) may be performed semi-statically, utilizing a signature sequence or discovery signal as described above. In this example, at time $T_0$, the resources may be partitioned between BS1 and BS2 according to a semi-static configuration provided by the discovery signal. Then at a later time $T_1$, the semi-static configuration may change according to another discovery signal such that all the resources are assigned to BS1.

Figure 9:
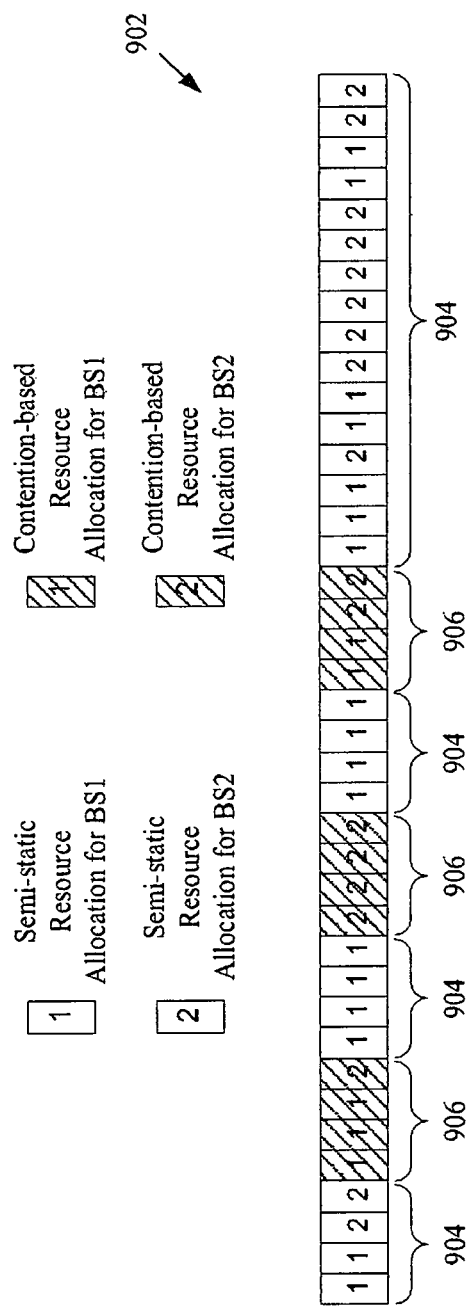
FIG. 9 is a schematic illustration of an exemplary timeline utilizing semi-static resource allocation and contention-based resource allocation according to some aspects of the disclosure.

In still another aspect of the disclosure, a semi-static allocation of resources on the shared spectrum may function at the same time, or during an overlapping time, along with a dynamic allocation of resources. FIG. 9 is a schematic illustration of an exemplary timeline 902 utilizing both semi-static resource allocation and contention-based resource allocation according to some aspects of the disclosure. Here, a semi-static resource allocation may be utilized for protecting a set of resources 904 (e.g., any suitable fraction of resources on the shared spectrum, such as a portion of a data channel). In this example, the resources may be partitioned among BS1 and BS2 according to a semi-static configuration. In an aspect of the present disclosure, the remaining resources 906 may be subject to contention-based access by devices or systems (e.g., BS1 and BS2) that wish to utilize the shared spectrum. In one aspect of the disclosure, a flow control handshake may be utilized between the devices and/or systems to manage resource reservation outside of the semi-static allocation.

In various existing communication protocols known to those of ordinary skill in the art, certain flow control signals called a request to send (RTS) and a clear to send (CTS) are used for reducing problematic frame collisions over a given medium. For example, an RTS signal may include, among other things, a requested duration of time to keep a channel open, an address or identity of the transmitting device, an address or identity of a receiving device. A CTS signal may be transmitted in response to the RTS, and may include, among other things, a duration of time when the channel may be available for the transmission, and the identity or address of the receiving device. Both the RTS and the CTS may include other information in addition to or alternative to the above in various examples. The exchange of these signals may be referred to as an RTS/CTS handshake.

In an aspect of the present disclosure, a waveform (e.g., a signature sequence) commonly understood by all systems accessing the shared spectrum, as described above, may be utilized to mimic the RTS/CTS handshake. In the present disclosure, the signature sequence-based RTS/CTS signaling may be referred to as nrRTS and nrCTS, to refer to a 5G New Radio (NR) system, currently under development. In some examples, RTS is an equivalent to a "reservation request" of a shared spectrum, and CTS is an equivalent to a "reservation response" of the request.

Figure 10:
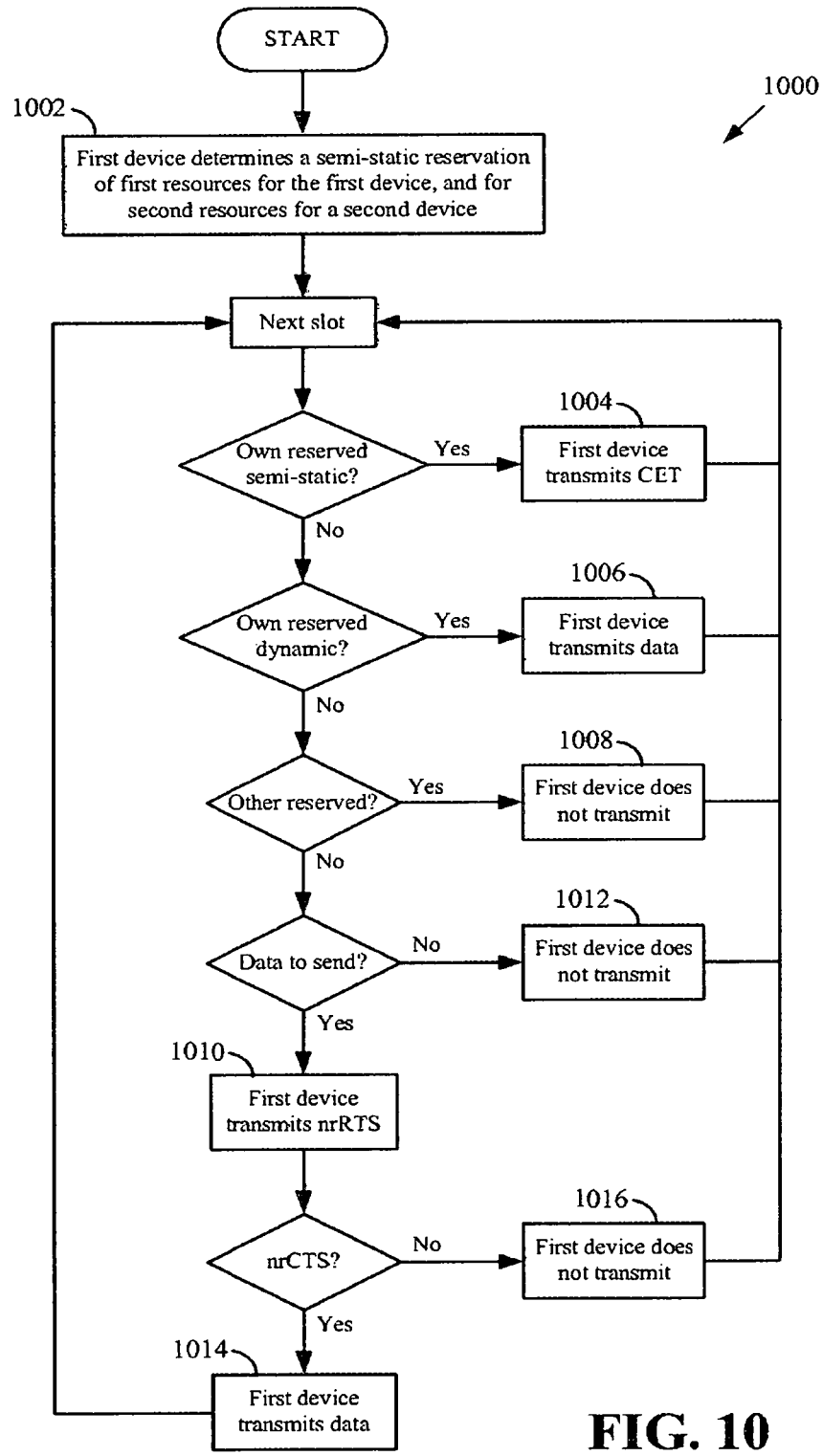
FIG. 10 is a flow chart illustrating an exemplary process for resource usage signaling in accordance with an aspect of the disclosure.

FIG. 10 is a flow chart illustrating an exemplary process 1000 for shared resources usage signaling in accordance with an aspect of the disclosure. This process 1000 may be performed by any of the devices described in relation to FIGS. 1 and/or 2. In the illustrated example, at block 1002, a first device may utilize resource reservation determination circuitry 242 to determine a semi-static reservation of first resources for the first device, and second resources for a second device. This particular scenario is merely exemplary in nature to illustrate the given concepts. The determination of the semi-static resource reservations may be performed via signature sequence signaling, e.g., utilizing discovery signals or preamble transmissions as described above. For example, the device may transmit a signature sequence (e.g., discovery signal) to reserve semi-static resources.

Figure 11:
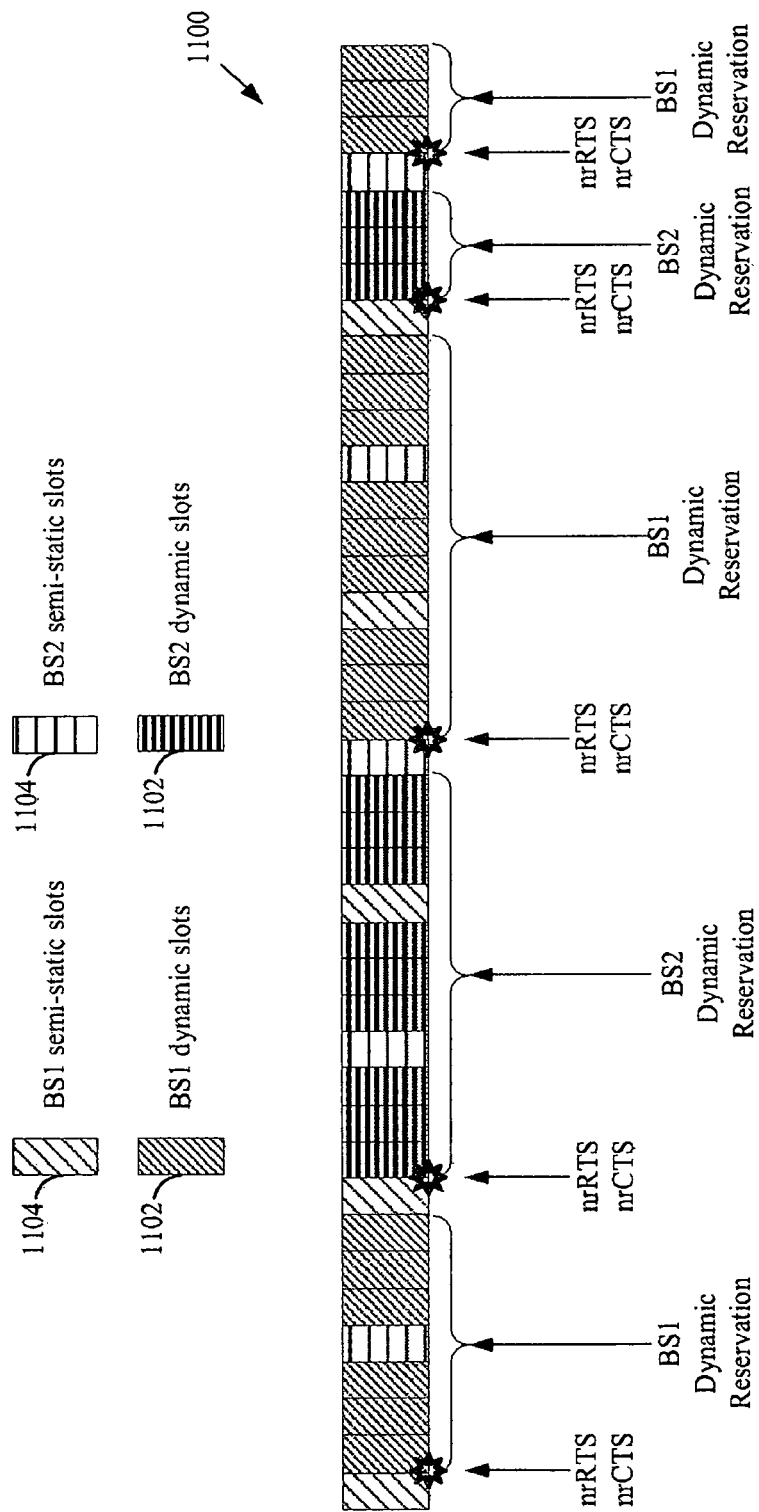
FIG. 11 is a schematic timeline illustrating an exemplary process for utilizing a shared spectrum using semi-static and dynamic resource reservation according to some aspects of the disclosure.

While describing FIG. 10, reference will also be made to FIG. 11, which illustrates a schematic timeline of the same algorithm applied to a shared spectrum.

As illustrated, the first device may first utilize resource reservation determination circuitry 242 to determine whether a given slot or resource is reserved for the first device as a semi-static resource (e.g., first resources). At block 1004, if the first device determines that the slot is the first device's own semi-static resource, then the first device may transmit a CET, or any other transmission without using contention-based access (e.g., LBT). At block 1006, if the first device determines that the slot is the device's own reserved dynamic resource (discussed more below and determined based on the nrRTS/nrCTS handshake), then the device may transmit data and/or control information on the dynamic resource. Unlike semi-static resources, dynamic resources may be assigned or allocated to different systems per slot.

At block 1008, if the first device determines that the slot is a reserved resource for any other device or system (e.g., a semi-static reserved protected resource and/or a dynamic reservation of a resource), then the first device may not transmit (forgo transmitting) in that slot or resource.

At block 1010, if the first device determines that the slot or resource is not reserved either for the first device or its system, or for any other device or system, then if the first device has information or data it wishes to transmit, the first device may transmit an nrRTS; otherwise, the first device does not transmit (forgo transmitting) at block 1012. That is, the first device may transmit the signature sequence (e.g., nrRTS) to request resources on the shared spectrum. The first device may then monitor for a response transmission of a second signature sequence configured as a nrCTS. At block 1014, if the first device receives the corresponding nrCTS, then the first device transmits its information or data over the shared spectrum; otherwise, the first device does not transmit at block 1016.

Here, because the nrRTS/nrCTS handshake utilizes the signature sequence waveform, other devices, in the same system or in a different system (e.g., different operator and/or different RAT) may be configured to receive and comprehend the nrRTS/nrCTS handshake and observe the reservation of resources made using this signaling. Accordingly, other systems may observe the dynamic reservation of resources made by the first device.

In an aspect of the disclosure, as illustrated in FIG. 11, the semi-static reservation of resources (e.g., slots) may be periodic for one or more different systems or devices, occupying a portion of the resources on the shared spectrum 1100. As illustrated in FIG. 11, the dynamic reservation of resources 1102 utilizing the nrRTS/nrCTS handshake may extend for a duration that lasts until the next semi-static reservation 1104. In another example, the dynamic reservation of resources 1102 utilizing the nrRTS/nrCTS handshake may extend for a duration that extends beyond one or more semi-static reservations of resources 1104. In some examples, the semi-static reservation of resources may take a higher priority than the dynamic reservation. Accordingly, the transmission of information according to a dynamic reservation may temporarily halt, suspend or pause for any semi-statically reserved resources, and may resume after the semi-static resource ends.

In one configuration, the wireless communication device 200 includes means for semi-statically reserving a first set of resources on a shared spectrum by utilizing a first waveform configured to be understood by a plurality of systems utilizing the shared spectrum; means for transmitting a CET during the semi-statically reserved first set of resources; and means for utilizing a contention-based access mechanism to access the shared spectrum using a second set of resources other than the first set of resources.

In one aspect, the aforementioned means may be the processor 204 in which the invention resides from FIG. 2 configured to perform the functions recited by the aforementioned means. In another aspect, the aforementioned means may be a circuit or any apparatus configured to perform the functions recited by the aforementioned means.

Of course, in the above examples, the circuitry included in the processor 204 is merely provided as an example, and other means for carrying out the described functions may be included within various aspects of the present disclosure, including but not limited to the instructions stored in the computer-readable storage medium 206, or any other suitable apparatus or means described in any one of the FIGS. 1, and/or 2, and utilizing, for example, the processes and/or algorithms described herein in relation to FIGS. 3 and/or 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable by a first device utilizing a shared spectrum for communication over a first system, the method comprising:
   semi-statically reserving a first set of resources on the shared spectrum by utilizing a first signature sequence standardized by a plurality of systems utilizing the shared spectrum, wherein the semi-statically reserved first set of resources remains effective until another signature sequence configured to modify the first set of resources;
   transmitting, without first checking for a clear channel, at least one of synchronization signals, reference signals, broadcast channels, discovery signals, control channel messages, or quality of service (QoS) sensitive data during the semi-statically reserved first set of resources; and
   utilizing a contention-based access mechanism to access the shared spectrum using a second set of resources other than the first set of resources.

2. The method of claim 1, further comprising:
   monitoring for a second signature sequence indicating a second semi-static reservation of resources for a second system other than the first system; and
   forgoing to transmit and to utilize the contention-based access mechanism to access the shared spectrum corresponding to the second semi-static reservation of resources.

3. The method of claim 1, further comprising:
   transmitting a second signature sequence configured as a discovery signal to indicate resource usage by the first device on the shared spectrum, during the semi-statically reserved first set of resources.

4. The method of claim 1, further comprising:
   determining an energy of a second signature sequence received from a second system;
   if the energy is greater than an energy threshold, employing the contention-based access mechanism for data transmissions; and
   if the energy is not greater than the energy threshold, utilizing a semi-static partitioning of resources on a data channel for the data transmissions, wherein the semi-static partitioning is based on one or more received discovery signals from one or more other systems.

5. The method of claim 1, wherein the utilizing the contention-based access mechanism comprises:
   transmitting a second signature sequence configured to act as a request to send (RTS);
   receiving a third signature sequence configured to act as a clear to send (CTS);
   determining a dynamic reservation of resources on the shared spectrum based on the RTS and CTS; and
   transmitting on the resources corresponding to the dynamic reservation.

6. The method of claim 5,
   wherein the dynamic reservation of resources extends for a duration of time that overlaps at least one resource corresponding to the semi-static reservation; and
   wherein the transmitting on the resources corresponding to the dynamic reservation comprises:
      pausing the transmitting on the resources corresponding to the dynamic reservation, to make way for the semi-static reservation; and
      resuming the transmitting on the resources corresponding to the dynamic reservation subsequent to the resources corresponding to the semi-static reservation.

7. The method of claim 1, wherein the first set of resources comprises resources that recur periodically.

8. A wireless communication device comprising:
   a processor;
   a memory communicatively coupled to the processor; and
   a transceiver communicatively coupled to the processor, wherein the processor, transceiver, and memory are configured to:
semi-statically reserve a first set of resources on a shared spectrum for communication over a first system by utilizing a first signature sequence standardized by a plurality of systems utilizing the shared spectrum, wherein the semi-statically reserved first set of resources remains effective until another signature sequence configured to modify the first set of resources;
transmit, without first checking for a clear channel, at least one of synchronization signals, reference signals, broadcast channels, discovery signals, control channel messages, or quality of service (QoS) sensitive data during the semi-statically reserved first set of resources; and
utilize a contention-based access mechanism to access the shared spectrum using a second set of resources other than the first set of resources.

9. The wireless communication device of claim 8, wherein the processor, transceiver, and memory are further configured to:
monitor for a second signature sequence indicating a second semi-static reservation of resources for a second system other than the first system; and
forgo to transmit and to utilize the contention-based access mechanism to access the shared spectrum corresponding to the second semi-static reservation of resources.

10. The wireless communication device of claim 8, wherein the processor, transceiver, and memory are further configured to:
transmit a second signature sequence configured as a discovery signal to indicate resource usage by the wireless communication device on the shared spectrum, during the semi-statically reserved first set of resources.

11. The wireless communication device of claim 8, wherein the processor, transceiver, and memory are further configured to:
determine an energy of a second signature sequence received from a second system;
if the energy is greater than an energy threshold, employ the contention-based access mechanism for data transmissions; and
if the energy is not greater than the energy threshold, utilize a semi-static partitioning of resources on a data channel for the data transmissions, wherein the semi-static partitioning is based on one or more received discovery signals from one or more other systems.

12. The wireless communication device of claim 8, wherein the processor, transceiver, and memory are further configured to utilize the contention-based access mechanism by:
transmitting a second signature sequence configured to act as a request to send (RTS);
receiving a third signature sequence configured to act as a clear to send (CTS);
determining a dynamic reservation of resources on the shared spectrum based on the RTS and CTS; and
transmitting on the resources corresponding to the dynamic reservation.

13. The wireless communication device of claim 12, wherein the dynamic reservation of resources extends for a duration of time that overlaps at least one resource corresponding to the semi-static reservation; and
wherein the processor, transceiver, and memory are further configured to:
pause the transmitting on the resources corresponding to the dynamic reservation, to make way for the semi-static reservation; and
resume the transmitting on the resources corresponding to the dynamic reservation subsequent to the resources corresponding to the semi-static reservation.

14. The wireless communication device of claim 8, wherein the first set of resources comprises resources that recur periodically.

15. A non-transitory computer readable medium storing computer executable code comprising instructions for causing a first device to utilize a shared spectrum for communication over a first system, by:
semi-statically reserving a first set of resources on the shared spectrum by utilizing a first signature sequence standardized by a plurality of systems utilizing the shared spectrum, wherein the semi-statically reserved first set of resources remains effective until another signature sequence configured to modify the first set of resources;
transmitting, without first checking for a clear channel, at least one of synchronization signals, reference signals, broadcast channels, discovery signals, control channel messages, or quality of service (QoS) sensitive data during the semi-statically reserved first set of resources; and
utilizing a contention-based access mechanism to access the shared spectrum using a second set of resources other than the first set of resources.

16. The non-transitory computer readable medium of claim 15, wherein the instructions further cause the first device to:
monitor for a second signature sequence indicating a second semi-static reservation of resources for a second system other than the first system; and
forgo to transmit and to utilize the contention-based access mechanism to access the shared spectrum corresponding to the second semi-static reservation of resources.

17. The non-transitory computer readable medium of claim 15, wherein the instructions further cause the first device to:
transmit a second signature sequence configured as a discovery signal to indicate resource usage by the first device on the shared spectrum, during the semi-statically reserved first set of resources.

18. The non-transitory computer readable medium of claim 15, wherein the instructions further cause the first device to:
determine an energy of a second signature sequence received from a second system;
if the energy is greater than an energy threshold, employ the contention-based access mechanism for data transmissions; and
if the energy is not greater than the energy threshold, utilize a semi-static partitioning of resources on a data channel for the data transmissions, wherein the semi-static partitioning is based on one or more received discovery signals from one or more other systems.

19. The non-transitory computer readable medium of claim 15, wherein the instructions further cause the first device to utilize the contention-based access mechanism to:
transmit a second signature sequence configured to act as a request to send (RTS);
receive a third signature sequence configured to act as a clear to send (CTS);

determine a dynamic reservation of resources on the shared spectrum based on the RTS and CTS; and transmit on the resources corresponding to the dynamic reservation.

20. The non-transitory computer readable medium of claim 19,
wherein the dynamic reservation of resources extends for a duration of time that overlaps at least one resource corresponding to the semi-static reservation; and
wherein the instructions further cause the first device to transmit on the resources corresponding to the dynamic reservation by:
pausing the transmitting on the resources corresponding to the dynamic reservation, to make way for the semi-static reservation; and
resuming the transmitting on the resources corresponding to the dynamic reservation subsequent to the resources corresponding to the semi-static reservation.

21. A wireless communication device configured to utilize a shared spectrum for communication over a first system, comprising:
means for semi-statically reserving a first set of resources on the shared spectrum by utilizing a first signature sequence standardized by a plurality of systems utilizing the shared spectrum, wherein the semi-statically reserved first set of resources remains effective until another signature sequence configured to modify the first set of resources;
means for transmitting, without first checking for a clear channel, at least one of synchronization signals, reference signals, broadcast channels, discovery signals, control channel messages, or quality of service (QoS) sensitive data during the semi-statically reserved first set of resources; and
means for utilizing a contention-based access mechanism to access the shared spectrum using a second set of resources other than the first set of resources.

22. The wireless communication device of claim 21, further comprising:
means for monitoring for a second signature sequence indicating a second semi-static reservation of resources for a second system other than the first system; and
means for forgoing to transmit and to utilize the contention-based access mechanism to access the shared spectrum corresponding to the second semi-static reservation of resources.

23. The wireless communication device of claim 21, further comprising:
means for transmitting a second signature sequence configured as a discovery signal to indicate resource usage by the first device on the shared spectrum, during the semi-statically reserved first set of resources.

24. The wireless communication device of claim 21, further comprising:
means for determining an energy of a second signature sequence received from a second system;
means for if the energy is greater than an energy threshold, employing the contention-based access mechanism for data transmissions; and
means for if the energy is not greater than the energy threshold, utilizing a semi-static partitioning of resources on a data channel for the data transmissions, wherein the semi-static partitioning is based on one or more received discovery signals from one or more other systems.

25. The wireless communication device of claim 21, wherein the means for utilizing the contention-based access mechanism comprises:
means for transmitting a second signature sequence configured to act as a request to send (RTS);
means for receiving a third signature sequence configured to act as a clear to send (CTS);
means for determining a dynamic reservation of resources on the shared spectrum based on the RTS and CTS; and
means for transmitting on the resources corresponding to the dynamic reservation.

26. The wireless communication device of claim 25,
wherein the dynamic reservation of resources extends for a duration of time that overlaps at least one resource corresponding to the semi-static reservation; and
wherein the means for transmitting on the resources corresponding to the dynamic reservation is configured to:
pause the transmitting on the resources corresponding to the dynamic reservation, to make way for the semi-static reservation; and
resume the transmitting on the resources corresponding to the dynamic reservation subsequent to the resources corresponding to the semi-static reservation.

* * * * *